United States Patent
Kecalevic et al.

(10) Patent No.: US 11,396,327 B2
(45) Date of Patent: Jul. 26, 2022

(54) HOLDING DEVICE FOR ELECTRICAL COMPONENTS AND MOTOR VEHICLE HAVING A HOLDING DEVICE OF THIS KIND

(71) Applicant: Bayerische Motoren Werke Aktiengesellschaft, Munich (DE)

(72) Inventors: Nermin Kecalevic, Markt Schwaben (DE); Georg Lange, Zwickau (DE); Benjamin Werner, Munich (DE)

(73) Assignee: Bayerische Motoren Werke Aktiengesllschaft, Munich (DE)

( * ) Notice: Subject to any disclaimer, the term of this patent is extended or adjusted under 35 U.S.C. 154(b) by 114 days.

(21) Appl. No.: 16/962,335

(22) PCT Filed: Jan. 21, 2019

(86) PCT No.: PCT/EP2019/051374
§ 371 (c)(1),
(2) Date: Jul. 15, 2020

(87) PCT Pub. No.: WO2019/162010
PCT Pub. Date: Aug. 29, 2019

(65) Prior Publication Data
US 2020/0339197 A1    Oct. 29, 2020

(30) Foreign Application Priority Data
Feb. 21, 2018   (DE) ..................... 10 2018 202 616.5

(51) Int. Cl.
*B60J 7/00*      (2006.01)
*B62D 21/15*     (2006.01)
(Continued)

(52) U.S. Cl.
CPC .............. *B62D 21/152* (2013.01); *B60K 1/04* (2013.01); *B62D 25/082* (2013.01); *B60K 2001/0438* (2013.01)

(58) Field of Classification Search
CPC ... H04W 72/04; H04W 24/10; H04W 72/042; A61P 35/00; A61P 29/00; Y02T 10/12;
(Continued)

(56) References Cited

U.S. PATENT DOCUMENTS

2012/0007373 A1*   1/2012   Boettcher ............... B60R 19/24
                                                      296/203.02
2014/0216839 A1*   8/2014   Brockhoff ............ B62D 21/155
                                                      180/232
(Continued)

FOREIGN PATENT DOCUMENTS

CN        203402258 U      1/2014
CN        205524470 U      8/2016
(Continued)

OTHER PUBLICATIONS

English translation of Chinese Office Action issued in Chinese Application No. 201980006050.1 dated Nov. 18, 2021 (eight (8) pages).
(Continued)

*Primary Examiner* — Kiran B Patel
(74) *Attorney, Agent, or Firm* — Crowell & Moring LLP

(57) ABSTRACT

A holding device for electrical components of a motor vehicle, preferably an electrical motor vehicle, includes a holding element that is designed to hold one or more electrical components of the vehicle. The holding element has a holding section for holding the one or more electrical components, and a strut section, which extends from the holding section. The holding element is designed such that when the holding element is attached to the motor vehicle as
(Continued)

intended, the strut section extends in the vehicle front direction and vehicle transverse direction to a vehicle front section and is at a predefined angle to an axis oriented in the vehicle front direction.

8 Claims, 3 Drawing Sheets

(51) Int. Cl.
 *B60K 1/04* (2019.01)
 *B62D 25/08* (2006.01)
(58) Field of Classification Search
 CPC ......... E05B 81/06; E05B 77/28; Y02E 60/10; A61K 2039/505
 See application file for complete search history.

(56) References Cited

U.S. PATENT DOCUMENTS

| | | | |
|---|---|---|---|
| 2016/0144901 A1* | 5/2016 | Kamm | B62D 25/085 180/312 |
| 2017/0137063 A1* | 5/2017 | Lee | B62D 21/152 |
| 2017/0182873 A1* | 6/2017 | Baccouche | B62D 25/087 |
| 2017/0210424 A1 | 7/2017 | Makowski et al. | |
| 2019/0135100 A1 | 5/2019 | Lange et al. | |

FOREIGN PATENT DOCUMENTS

| | | |
|---|---|---|
| CN | 106985777 A | 7/2017 |
| CN | 206475940 U | 9/2017 |
| DE | 10 2008 039 315 A1 | 2/2010 |
| DE | 10 2008 059 608 A1 | 8/2010 |
| DE | 10 2013 101 085 A1 | 8/2014 |
| DE | 10 2014 018 401 A1 | 11/2015 |
| DE | 10 2014 117 004 A1 | 5/2016 |
| DE | 20 2016 107 008 U1 | 4/2017 |
| DE | 10 2017 101 116 A1 | 7/2017 |
| DE | 10 2016 221 032 A1 | 4/2018 |
| KR | 10-2017-0056878 A | 5/2017 |
| WO | WO 2018/007204 A1 | 1/2018 |

OTHER PUBLICATIONS

International Search Report (PCT/ISA/210) issued in PCT Application No. PCT/EP2019/051374 dated Apr. 10, 2019 with English translation (six pages).

German-language Written Opinion (PCT/ISA/237) issued in PCT Application No. PCT/EP2019/051374 dated Apr. 10, 2019 (six pages).

German-language Search Report issued in German Application No. 10 2018 202 616.5 dated Dec. 14, 2018 with partial English translation (12 pages).

\* cited by examiner

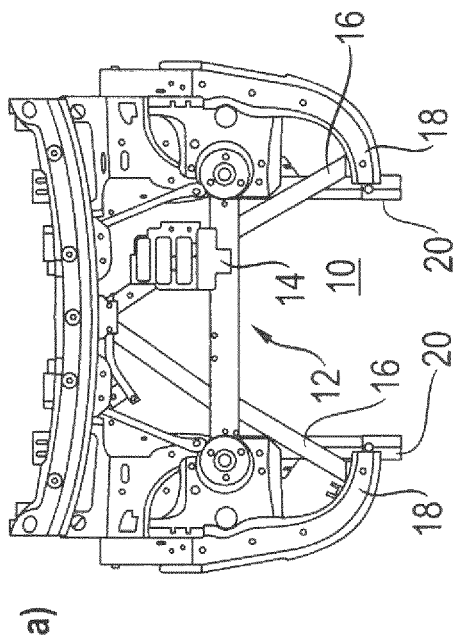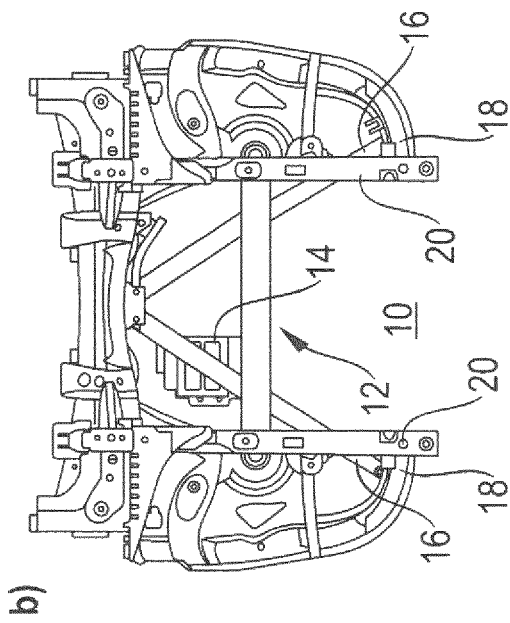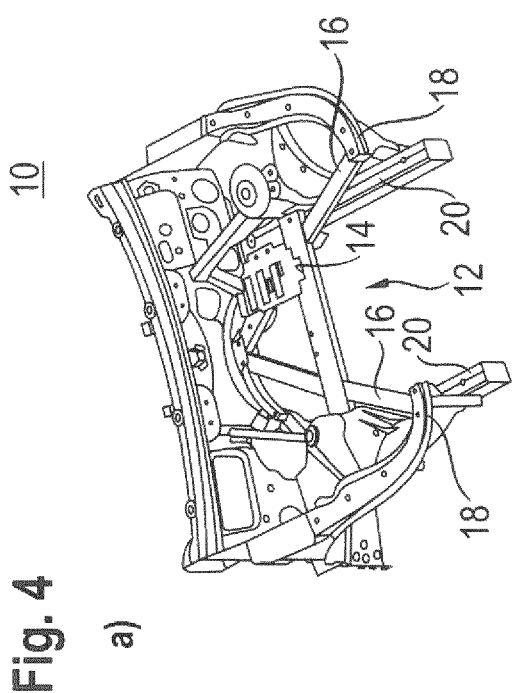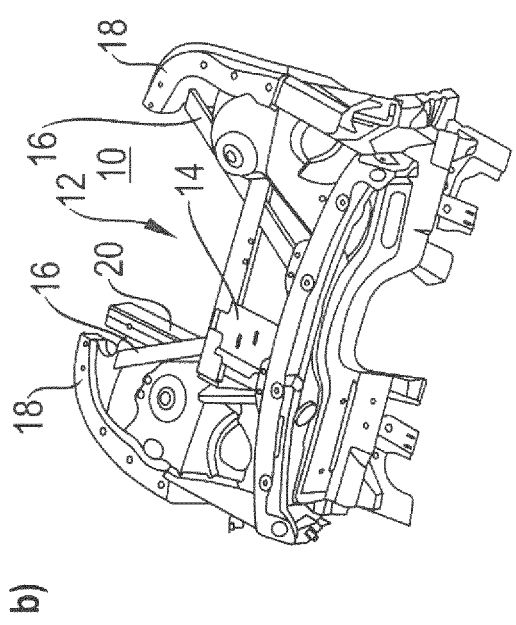

HOLDING DEVICE FOR ELECTRICAL COMPONENTS AND MOTOR VEHICLE HAVING A HOLDING DEVICE OF THIS KIND

BACKGROUND AND SUMMARY OF THE INVENTION

The invention relates to a holding apparatus for electric components of a motor vehicle, preferably of an electric motor vehicle such as an electric car, also widely known as an E-car, E-mobile or electromobile (BEV=Battery Electric Vehicle).

Furthermore, the invention relates to a motor vehicle, preferably an electric motor vehicle, with a holding apparatus of this type.

The safety of motor vehicles such as electromobiles, in particular their behavior in the case of a vehicle crash or their collision behavior, is always a factor to be taken into consideration in the case of motor vehicle development and in the case of the design of motor vehicle safety systems.

For this purpose, various crash tests have been established, which reconstruct collisions of vehicles under realistic, controlled conditions. Crash tests of this type serve to gain knowledge about the behavior of a vehicle, its occupants or the cargo in the case of different crash configurations. As a result, knowledge can be gained about vehicle safety, for example in the case of weak points of the vehicle being revealed.

Inter alia, the crash test which has been developed by the IIHS (Insurance Institute for Highway Safety), what is known as the "small overlap test", is known which (as other crash tests also do) attempts to replicate or reconstruct a defined type of an actually occurring accident/crash very precisely. In the case of the "small overlap test", a frontal impact with an overlap of 25% at 64 km/h is carried out, that is to say 25% of the vehicle width strikes a rigid obstacle. The crash test simulates, for example, the case if, in the case of a rear end collision with a vehicle in front, the driver attempts to evade to the left or right, but no longer quite gets past the vehicle in front. Here, fundamentally different loads act on the motor vehicle than in the case of a larger overlap.

In conjunction with the "small overlap test", it is an aim to deflect the motor vehicle in a vehicle transverse direction (y-direction of the conventional vehicle coordinate system) in the case of the collision with the obstacle, that is to say to allow the motor vehicle to slide laterally on a barrier or an obstacle, which is achieved for example, by a part of the kinetic energy triggered by way of the collision not being compensated for by way of energy absorption using a vehicle structure deformation, but rather resulting in a displacement of the vehicle in the vehicle transverse direction.

This is realized, for example, by virtue of the fact that conventional vehicles are equipped with correspondingly designed front axle carriers or corresponding longitudinal carriers which facilitate the lateral displacement of the vehicle in the vehicle transverse direction.

It is an object of the invention to further improve the collision behavior of vehicles, in particular to further facilitate the displacement of the vehicle in the vehicle transverse direction in the case of a collision.

This object is achieved by way of a holding apparatus and by way of a motor vehicle having such a holding apparatus in accordance with the claimed invention.

The holding apparatus according to the invention for electric components of a motor vehicle, preferably of an electric motor vehicle, comprises a holding element which is set up to hold one or a plurality of electric components of the vehicle, the holding element having a holding section for holding the one or the plurality of electric components, and a strut section which extends from the holding section, the holding element being configured in such a way that, in the case of correct fastening of the holding element to the motor vehicle, the strut section extends in the vehicle front direction and vehicle transverse direction as far as a vehicle front section, and is at a predefined angle with respect to an axis which points in the vehicle front direction.

The holding element of the holding apparatus according to the invention is frequently also called what is known as a "shelf" (BEV unit carrier) in the electric motor vehicle, which holding element is conventionally used merely as a holder for the electric components. According to the invention, the holding element or the shelf is configured in such a way that the lateral sliding of the motor vehicle or the electric motor vehicle on the obstacle or the barrier is facilitated, while the holding element or the shelf continues to assume its conventional function, namely holding the electric components of the electric motor vehicle. Accordingly, the holding element or the shelf has had a further function added. To this end, it is therefore provided that the motor vehicle 50 can slide laterally on the obstacle, in particular, in the case of the "small overlap test", by the holding element contributing to introducing a momentum (M) which originates as a result of the impact (I) with the obstacle 55 into the rigid or hardly deformable vehicle body 60 in the Y-direction or vehicle transverse direction, which leads to a lateral displacement of the vehicle. In other words, the "shelf" according to the invention is configured firstly as a holder for electric components of the electric car, whereas it is configured, furthermore, in such a way that it can likewise build up a momentum in the Y-direction and can introduce it into the vehicle body 60, in order in this way to bring about lateral sliding of the vehicle on the barrier or the obstacle. This is brought about, in particular, by virtue of the fact that, in addition to the holding section, the holding element or the "shelf" has an obliquely extending strut section or an oblique "horn", into which the Y-momentum is first of all introduced in the case of the impact. The "horn" preferably protrudes in the Y-direction further than the motor subframe of the motor vehicle or electric vehicle, in order for it to be possible for contact to be built up with the barrier or the obstacle 55. Accordingly, the shelf is designed in such a way that the given structural paths can absorb the forces. The shelf preferably follows the end wall contour and bears against it in the case of a crash load. Here, the strut section or the shelf horn is of sufficiently rigid design, in order to introduce the forces into the holding section and, via the latter, into the vehicle body.

The holding apparatus according to the invention can be developed in an advantageous way such that, in the case of correct fastening of the holding element to the motor vehicle, the strut section lies in a plane which is defined by way of the axis which points in the vehicle front direction and an axis which points in the vehicle transverse direction. The holding section and the strut section of the holding element preferably lie in one plane.

Furthermore, the holding apparatus according to the invention can be implemented in such a way that the strut section is set up to be connected to a carrier which is formed by way of the vehicle front section.

Moreover, the holding apparatus according to the invention can be realized in such a way that the holding element has two strut sections which extend from the holding section and, in the case of correct fastening of the holding element to the motor vehicle, extend in each case in the front direction and in each case differently in the vehicle transverse direction of the motor vehicle as far as the vehicle front section in such a way that the strut sections run in a V-shaped manner at least in sections. The two strut sections preferably lie together with the holding section in one plane (X-Y plane).

Furthermore, the holding apparatus according to the invention can be developed in such a way that the holding section is set up to hold an on-board electric system battery, an air conditioning compressor, a cooling unit, a charging unit and/or a converter unit.

The motor vehicle according to the invention, in particular the electric motor vehicle, comprises the holding apparatus according to the invention and one or a plurality of electric components which are held by the holding section of the holding element of the holding apparatus, the holding element being arranged on the motor vehicle in such a way that the strut section of the holding element extends in the vehicle front direction and vehicle transverse direction as far as a vehicle front section, and is at a predefined angle with respect to an axis which points in the vehicle front direction. This results in the properties and advantages which are described in conjunction with the holding apparatus according to the invention in an identical or similar way, for which reason reference is made to the above comments in conjunction with the holding apparatus according to the invention in order to avoid repetitions.

In the following text, preferred embodiments of the invention will be described by way of example on the basis of the appended figures.

BRIEF DESCRIPTION OF THE DRAWINGS

FIGS. 4a-4b show different views of the holding apparatus from FIG. 3.

FIGS. 5a-5b show further different views of the holding apparatus from FIG. 3.

DETAILED DESCRIPTION OF THE DRAWINGS

Figure 1:
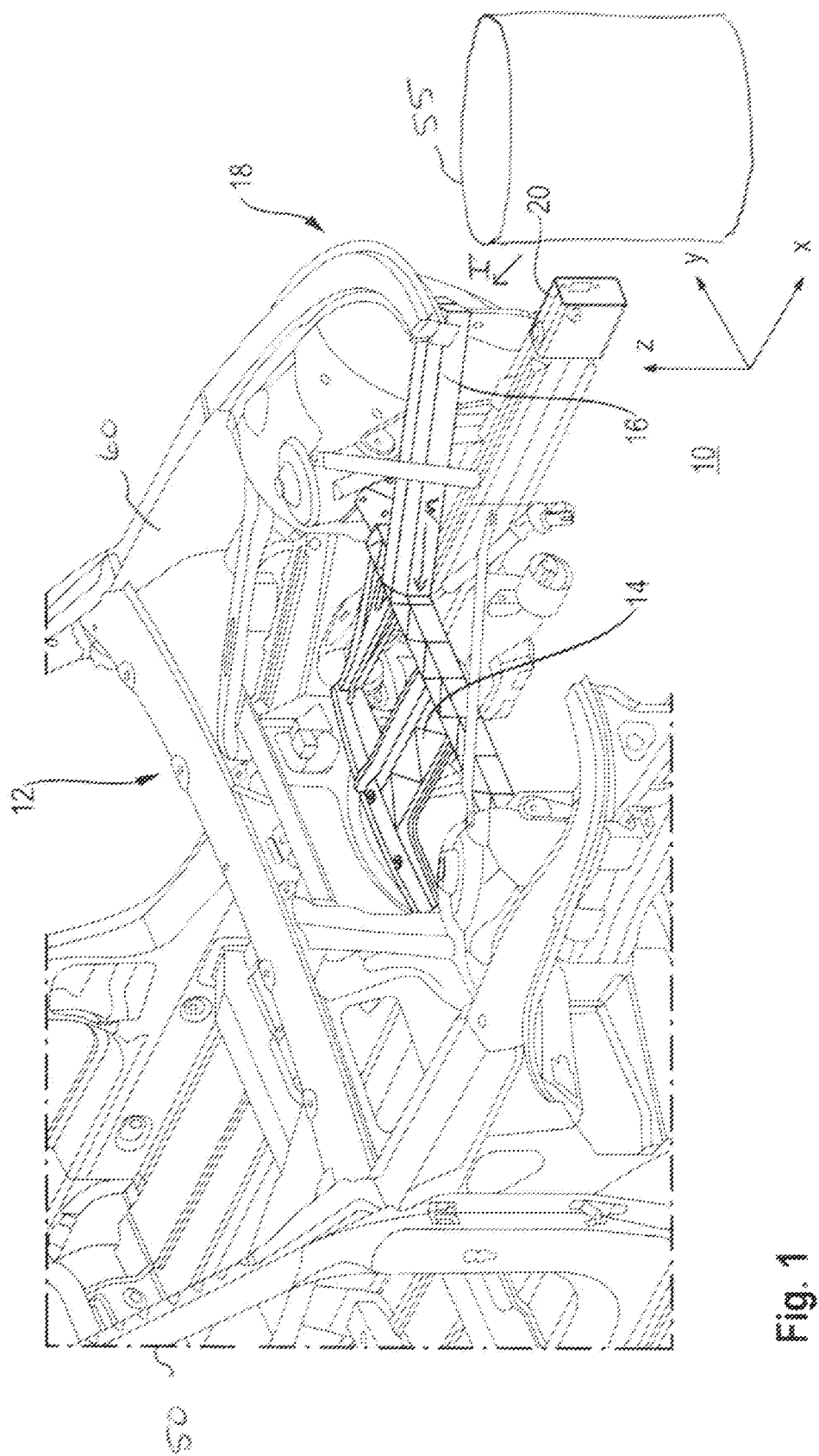
FIG. 1 is a diagrammatic view of a holding apparatus according to the invention in accordance with a first exemplary embodiment of the invention.
Figure 2:
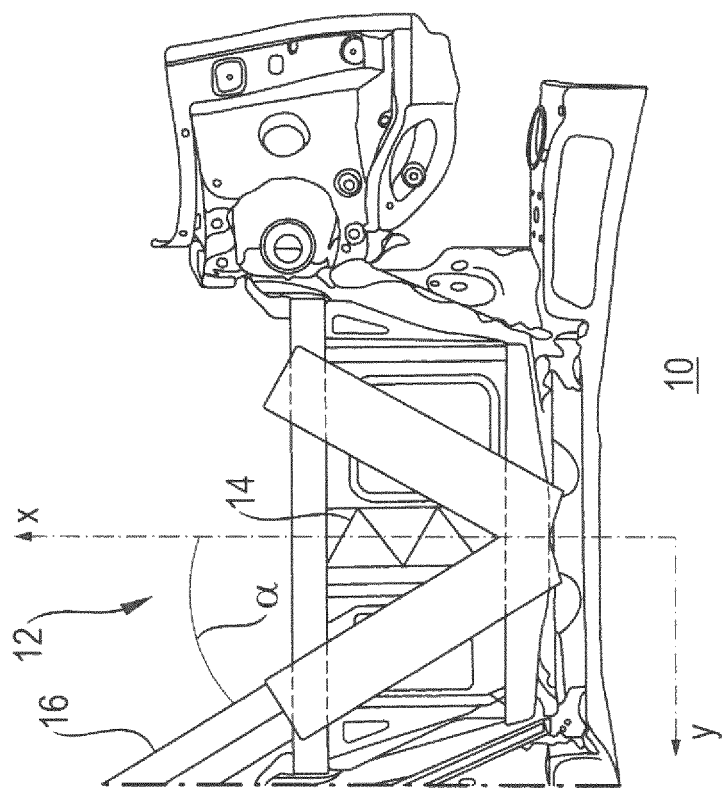
FIG. 2 is a diagrammatic plan view of the holding apparatus from FIG. 1.

FIG. 1 shows a diagrammatic view of a holding apparatus 10 in accordance with a first exemplary embodiment of the invention, and FIG. 2 shows a diagrammatic plan view of the holding apparatus 10 from FIG. 1.

As can be seen from FIGS. 1 and 2, a motor vehicle 50 (an electric motor vehicle in the present case) which is shown only partially comprises the holding apparatus 10 and a plurality of conventional electric components (not shown) which are held by way of the holding apparatus 10.

Examples for the electric components are an on-board electric system battery, an air conditioning compressor, a cooling unit, a charging unit for the on-board electric system battery, a converter unit, etc., which are held by way of a holding section of the holding apparatus 10. The holding section will be described in greater detail in the following text.

For this purpose, the holding apparatus 10 comprises a holding element 12 which is set up to hold the electric components of the vehicle. The holding element 12 has the abovementioned holding section 14 for holding the electric components, and a strut section 16 which extends from the holding section 14. As can likewise be seen from FIGS. 1 and 2, the holding element 12 is configured in such a way that, in the case of correct (intended) fastening of the holding element 12 to the motor vehicle, the strut section 16 extends, preferably above a longitudinal carrier 20 of the motor vehicle, in the vehicle front direction (in the direction of the X-axis of the vehicle coordinate system) and vehicle transverse direction (in the direction of the Y-axis of the vehicle coordinate system) as far as a vehicle front section 18, and is at a predefined angle $\alpha$ with respect to an axis oriented in the vehicle front direction (X-axis of the vehicle coordinate system).

In the exemplary embodiment, the strut section 16 lies in a plane which is defined by way of the axis which extends in the vehicle front direction (X-axis of the vehicle coordinate system) and the axis which extends in the vehicle transverse direction (Y-axis of the vehicle coordinate system). The same also applies to the holding section 14 which, in this case, is arranged in such a way that both the holding section 14 and the strut section 16 lie in the same plane (X-Y plane).

In the exemplary embodiment which is shown, the vehicle front section 18 is formed by way of a carrier which is connected to the strut section 16.

Figure 3:
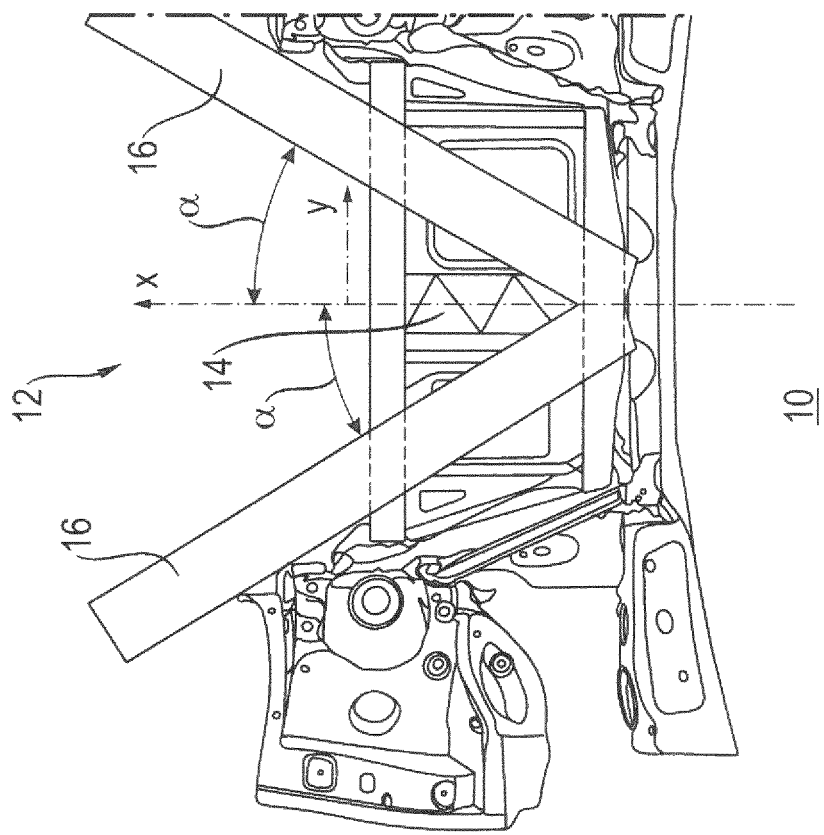
FIG. 3 is a diagrammatic view of a holding apparatus according to the invention in accordance with a second exemplary embodiment of the invention.

FIG. 3 shows a diagrammatic view of a holding apparatus 10 according to the invention in accordance with a second exemplary embodiment of the invention, whereas FIGS. 4 and 5 show different views of the holding apparatus according to the invention from FIG. 3. In the case of the description of the second exemplary embodiment, merely the differences with regard to the first exemplary embodiment are described in order to avoid repetitions.

The holding apparatus 10 in accordance with the second exemplary embodiment of the invention differs from that of the first exemplary embodiment in that the holding element 12 has two strut sections 16 which extend from the holding section 14 and, in the case of corresponding correct fastening of the holding element 12 to the motor vehicle, extend in each case in the front direction and in each case differently in the vehicle transverse direction of the vehicle as far as the vehicle front section 18 in such a way that the strut sections 16 run in a V-shaped manner at least in sections. Here, the two strut sections 16 and the holding section 14 lie in the same plane (X-Y plane).

The features of the invention which are disclosed in the above description, in the drawings and in the claims can be essential to the realization of the invention both individually and in any desired combination.

What is claimed is:
1. A motor vehicle, comprising:
one or a plurality of electric components of the vehicle;
a holding element connected to a vehicle body and configured to hold the one or the plurality of electric components of the vehicle,
the holding element comprising:
a holding section that holds the one or the plurality of electric components,
and
a strut section that extends from the holding section obliquely with respect to a vehicle front direction, wherein the holding section is arranged in the motor vehicle with the strut section of the holding element extending in the vehicle front direction and vehicle transverse direction as far as a vehicle front section, and at a predefined angle with respect to an axis oriented in the vehicle front direction, such that a momentum which originates from an impact of the vehicle front section with an obstacle is introduced from the strut section in the vehicle transverse direction into the vehicle body via the holding section.

2. The motor vehicle according to claim 1, wherein the strut section lies in a plane defined by way of the axis oriented in the vehicle front direction and an axis oriented in the vehicle transverse direction.

3. The motor vehicle according to claim 1, wherein the strut section is connected to a carrier which is formed by way of the vehicle front section.

4. The motor vehicle according to claim 1, wherein the holding element has two strut sections which extend from the holding section and extend, in each case, in the front direction and, in each case, differently in the vehicle transverse direction of the motor vehicle as far as the vehicle front section such that the two strut sections extend in a V-shaped manner at least in sections.

5. The motor vehicle according to claim 2, wherein the holding element has two strut sections which extend from the holding section and extend, in each case, in the front direction and, in each case, differently in the vehicle transverse direction of the motor vehicle as far as the vehicle front section such that the two strut sections extend in a V-shaped manner at least in sections.

6. The motor vehicle according to claim 3, wherein the holding element has two strut sections which extend from the holding section and extend, in each case, in the front direction and, in each case, differently in the vehicle transverse direction of the motor vehicle as far as the vehicle front section such that the two strut sections extend in a V-shaped manner at least in sections.

7. The motor vehicle according to claim 1, wherein the holding section is configured to hold an on-board electric system battery, an air conditioning compressor, a cooling unit, a charging unit and/or a converter unit.

8. The motor vehicle according to claim 1, wherein the motor vehicle is an electric motor vehicle.

* * * * *